(12) United States Patent
Wildeman

(10) Patent No.: US 6,277,469 B1

(45) Date of Patent: Aug. 21, 2001

(54) THREE DIMENSIONAL COMPOSITE FABRIC PRODUCT

(75) Inventor: Martin Wildeman, Spartanburg, SC (US)

(73) Assignee: Tietex International, Inc., Spartanburg, SC (US)

( * ) Notice: Subject to any disclaimer, the term of this patent is extended or adjusted under 35 U.S.C. 154(b) by 0 days.

(21) Appl. No.: 09/255,142

(22) Filed: Feb. 22, 1999

(51) Int. Cl.⁷ .................... B32B 3/28; B32B 3/30
(52) U.S. Cl. ................ 428/167; 428/172; 442/361; 442/381
(58) Field of Search .................. 442/381, 329, 442/361; 428/167, 172

(56) References Cited

U.S. PATENT DOCUMENTS

| | | |
|---|---|---|
| 3,649,428 * | 3/1972 | Hughes .................... 161/50 |
| 3,837,943 * | 9/1974 | Ploch et al. .............. 156/93 |
| 3,961,107 * | 6/1976 | Hammer et al. ........... 427/246 |
| 4,876,128 | 10/1989 | Zafiroglu . |
| 4,891,957 | 1/1990 | Strack et al. . |
| 5,187,952 | 2/1993 | Zafiroglu . |
| 5,203,186 * | 4/1993 | Zafiroglu ................. 66/192 |
| 5,491,017 * | 2/1996 | Todt ....................... 428/198 |
| 5,527,600 * | 6/1996 | Frankosky et al. ......... 428/286 |
| 5,543,004 * | 8/1996 | Tochacek et al. .......... 156/93 |
| 5,623,812 * | 4/1997 | Todt ....................... 53/442 |
| 5,705,566 * | 1/1998 | Todt ....................... 525/95 |
| 5,712,008 * | 1/1998 | Todt ....................... 428/349 |
| 5,736,231 * | 4/1998 | Todt ....................... 428/198 |

* cited by examiner

Primary Examiner—Terrel Morris
Assistant Examiner—Christopher C. Pratt
(74) Attorney, Agent, or Firm—Dority & Manning, P.A.

(57) ABSTRACT

A composite fabric product is produced which has a unique three dimensional conformation. The composite fabric product is made from at least two layers of fabric that are stitched together according to a pattern. After the layers are stitched together, the composite fabric undergoes a shrinking procedure in which one of the layers is shrunk more than at least one of the other layers causing the non-shrinking layer to form a three dimensional surface. This material can be made with a variety of fabrics and fills in order to optimize insulation, flexibility, cushioning and moisture management properties.

25 Claims, 3 Drawing Sheets

THREE DIMENSIONAL COMPOSITE FABRIC PRODUCT

FIELD OF THE INVENTION

The present invention is generally directed to a composite fabric that is particularly well suited for functioning as an insert or lining in an athletic shoe or boot, such as a ski boot. The present invention is also directed to a process for making the composite fabric.

BACKGROUND OF THE INVENTION

Three dimensional fabric substrates are well known in the art. The purpose of these past products has been to provide a composite fabric which will provide insulation and/or cushioning.

For instance, a stitchbonded nonwoven fabric is disclosed in U.S. Pat. No. 4,876,128 to Zafiroglu, which is incorporated herein by reference. In particular, the '128 patent discloses a stitchbonded fabric made to have improved insulating and stretchability characteristics and good laundering durability. The stitchbonded fabric is formed from a bonded fibrous layer stitchbonded with elastic thread under tension, which is then subjected to a relaxed shrinkage treatment to increase its thickness and volume. Alternatively, instead of inserting the yarn into the fibrous layer in an elongated condition, part or all of the retractive force can be supplied by shrinkage of the yarn. The shrinkage can be activated, for example, by heat, steam or a suitable chemical treatment after the yarn has been stitched into the fibrous layer.

In addition to single layer fabrics, multi-layer composite fabrics have also been constructed in the past having specially designed three dimensional conformations. The layers of these composite fabrics, however, were typically laminated together. Consequently, the composite fabrics lacked in durability and cohesiveness.

Although the above-described fabrics have performed satisfactory in several uses, their utility as an insulating fabric could be greatly enhanced, especially if significant increases could be made in the specific volume of the fabrics and in their resistance to deterioration by repeated washing. As such, a need currently exists for an improved three dimensional fabric and method for manufacturing the fabric. In particular, a need exists for a three dimensional fabric that is durable, that can be repeatedly laundered, that has good cushioning properties, that has good moisture management properties, that can be made stretchable, and that can be easily manufactured.

SUMMARY OF THE INVENTION

The present invention recognizes and addresses the foregoing disadvantages, and others of prior art constructions and methods.

Accordingly, it is an object of the present invention to provide an improved composite fabric that is durable in high wear applications and can provide insulation and cushioning where needed.

It is another object of the invention to provide a suitable fabric which is easy to manufacture.

These and other objects of the present invention are achieved by providing a process for producing a composite fabric that is particularly well suited for durability, insulation and cushioning. The process includes, in one embodiment, the steps of providing at least two layers of fabric which have either differing textures, shrinkage characteristics, and/ or elasticity characteristics. The layers are connected together preferably using stitchbonding according to a desired pattern. The resulting composite fabric is then relaxed or heat treated so as to cause one layer to contract, thus causing the other layer to gather and form a three dimensional fabric effect.

These and other objects of the present invention are also achieved by providing a three dimensional composite fabric product made from at least two (2) fabric layers. In particular, the composite fabric product can include a first fabric layer and a second fabric layer that are connected together by a plurality of parallel rows of stitches. The second fabric layer can contain shrinkable fibers. In accordance with the present invention, the second fabric layer is shrunk in relation to the first fabric layer after the layers have been connected together. In this manner, a plurality of ridges is formed defined by the second fabric layer. The formed ridges are located in between the parallel rows of stitches.

The second fabric layer containing the shrinkable fibers can be made from various materials according to various constructions. In one embodiment, the second fabric layer can be a stitchbonded fabric containing a nonwoven web with shrinkable fibers and/or a shrinkable stitchbonded yarn. For instance, the shrinkable fibers or yarn can be made from spandex fibers. Preferably, the second fabric layer has been shrunk at least 5% and particularly at least 10% in one direction after the fabric layers have been connected together.

In one embodiment, the three dimensional composite fabric product can further include a fill layer positioned in between the first fabric layer and the second fabric layer. The fill layer can be a fiber fleece made from high bulk fibers. For instance, the high bulk fibers can be siliconized fibers having a denier of at least 6.

Other objects, features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, including reference to the appended figures, in which.

Figure 1:
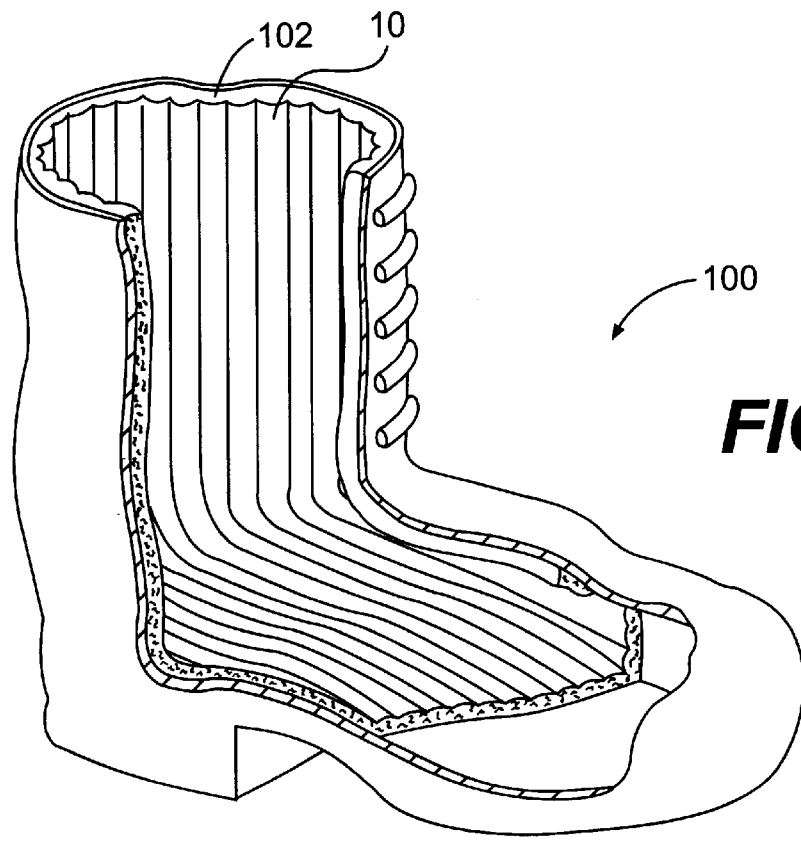
FIG. 1 is a perspective view with cutaway portions of a ski boot illustrating one embodiment of a composite fabric made in accordance with the present invention.

Repeat use of reference characters in the present specification and drawings is intended to represent same or analogous features or elements of the invention.

DETAILED DESCRIPTION OF THE PREFERRED EMBODIMENTS

It is to be understood by one of ordinary skill in the art that the present discussion is a description of exemplary embodiments only, and is not intended as limiting the broader aspects of the present invention. The broader aspects are embodied in the exemplary construction.

The present invention is generally directed to a composite fabric which is easy to manufacture and provides cushioning, is stretchable, and has good moisture management properties, insulating properties and ventilating properties. The benefits are not mutually exclusive, however, in optimizing each aspect of the fabric depending on the embodiment.

In general, the present invention is directed to a stitched composite fabric product that uses elastic yarns, high shrink yarns, and/or high shrink fibers to create a fabric product that has a unique three dimensional conformation. The three dimensional fabric effect is created by activating dimensional shrinkage by the application of heat to the composite product or by applying mechanical prestretch to individual fabric layers during formation of the composite fabric product. Once constructed, the fabric product is very durable and can withstand high wear applications and repeated launderings without delaminating or otherwise unraveling.

Composite fabric products made in accordance with the present invention have a distinctive and aesthetic appearance and are well suited for use in an almost limitless variety of applications. For instance, fabric products made in accordance with the present invention are well suited for use in footwear in order to surround, support, and provide cushioning to a foot. Alternatively, fabric products made according to the present invention can be used in medical applications, such as medical wraps. The fabric products also have great acoustic properties making them well suited for use in applications where noise insulation is desired. For example, composite fabrics made in accordance with the present invention can be used in constructing office panels and other similar dividers.

Figure 3:
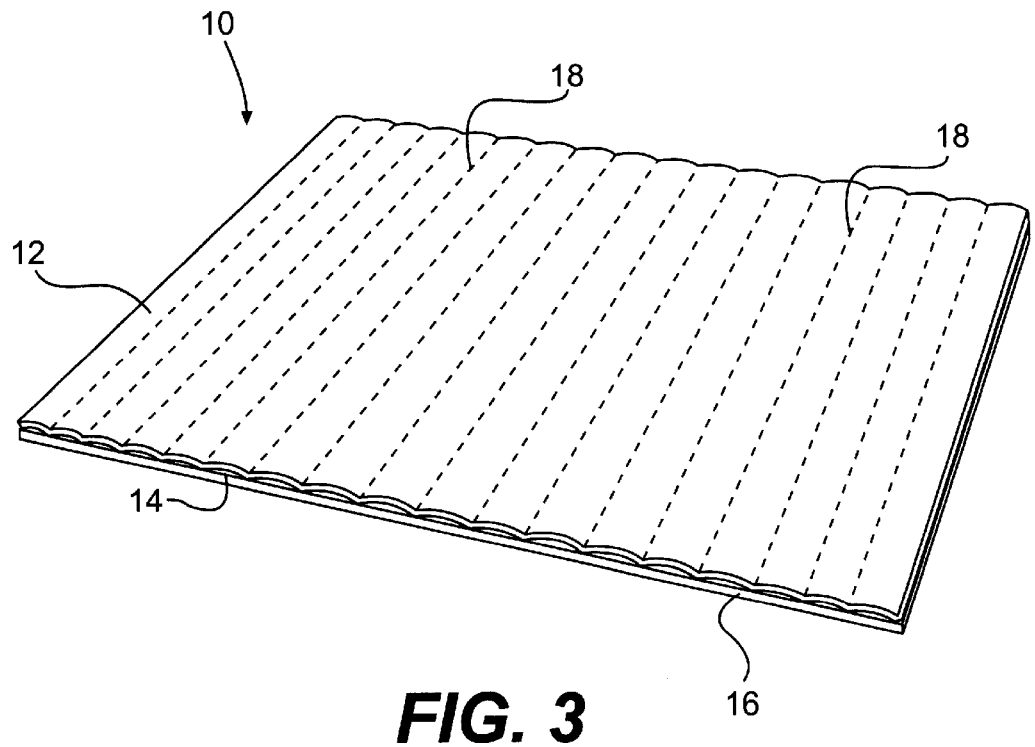
FIG. 3 is a three-ply embodiment of the invention after the fabric has been relaxed or has been heat treated.
Figure 4:
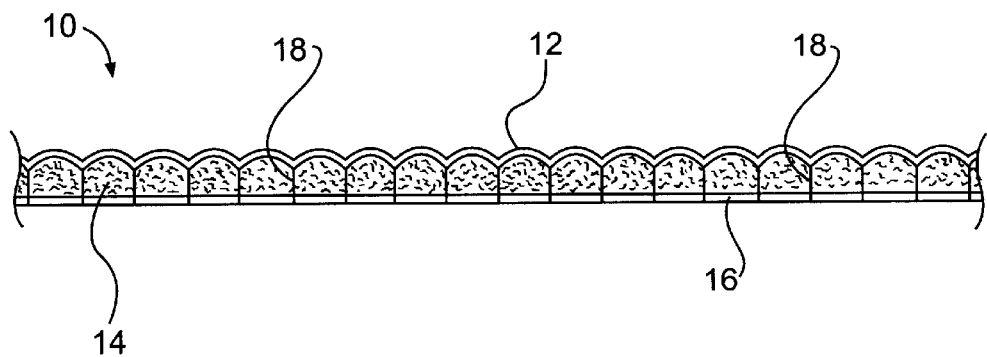
FIG. 4 is a cross-sectional view of the embodiment illustrated in FIG. 3.

Referring to FIGS. 1, 3, and 4, one embodiment of a composite fabric product made in accordance with the present invention is illustrated. In this embodiment, the fabric product includes three layers that have been assembled in order to produce a product having a ribbed-like three dimensional conformation. It has been discovered that this embodiment of the present invention is particularly well suited for use as a liner in a boot or shoe as shown in FIG. 1.

More particularly, FIG. 1 illustrates a ski boot generally 100, such as a boot designed to be worn in conjunction with a snowboard. Boot 100 includes a lining 102 constructed from a three dimensional composite fabric 10 made in accordance with the present invention. Lining 102 can be made from different panels of composite fabric 10 that are each stitched or otherwise attached to the interior of the boot or can comprise a bootie or sock that can be removed and inserted into boot 100 as desired. Once placed into boot 100, composite fabric 10 provides cushioning to the wearer, allows the foot to breathe, and removes moisture and perspiration away from the foot. Further, composite fabric 10 is very durable, and is deformable without permanently loosing its initial shape.

Referring to FIGS. 3 and 4, composite fabric 10 is more clearly illustrated. As shown, composite fabric 10 is a three layered fabric product including a first layer 12 or face fabric, a middle layer 14 or fill layer, and a third layer 16 which is a shrinkable and/or elastic layer. Layers 12, 14 and 16 are held together by a plurality of stitched, parallel rows 18. Stitched rows 18 can be, for instance, stitchbonded rows. As used herein stitchbonding refers to a bonding technique in which the fabrics or fibers of each layer are connected by stitches sewn or knitted through the web.

In general, composite fabric 10 having the illustrated three dimensional conformation is created by stitching together the three layers of material, wherein the layers of material have different shrinkage characteristics. Once stitched together, at least one layer of the composite fabric is shrunk or allowed to shrink more than at least one other layer which creates the three dimensional effect. For instance, third layer 16 can be made with either elastic yarn or fibers, high shrink yarn or fibers, and/or highly textured yarn or fibers. First layer 12 and middle layer 14, on the other hand, can be made from fibers or yarn with low shrink properties. Once all the layers are stitched together, third layer 16 can undergo a shrinking process causing the remaining layers to gather and form a three dimensional composite fabric.

The appearance of the resulting fabric will depend upon the design or pattern by which the layers are stitched together. For instance, a ribbed fabric results when parallel rows 18 are stitched into the layers.

The manner in which third layer 16 is shrunk can depend upon the particular application. For example, in one embodiment, third layer 16 can be made from fibers that shrink and/or coil when subjected to heat. Alternatively, third layer 16 can be made from an elastic material that is stretched until the layers are stitched together. Once the layers are attached, the fabric is allowed to relax causing third layer 16 to shrink in dimension which creates a three dimensional composite product.

Third layer or shrinkable layer 16 can be made from various materials such as films, knit fabrics, nonwoven fabrics, and woven fabrics. In one preferred embodiment, third layer 16 is made from a stitchbonded fabric, such as a single or multibar maliwatt fabric having, for instance a gauge of at least 20 rows per inch and particularly 28 rows per inch. A stitchbonded fabric generally refers to a fabric made from a nonwoven web in which the fibers of the web are connected by stitches knitted or sewn through the web. In a maliwatt stitchbonded fabric, the needles that are punched through the nonwoven substrate are threaded so that stitchbonded threaded rows are formed into the fabric. In an alternative embodiment, the stitchbonded fabric can be a malifleece stitchbonded fabric that is formed without the use of thread. Specifically, malifleece fabrics are formed using barbed needles that pick up fibers contained within the nonwoven substrate to form the stitchbonded rows.

In one embodiment of the present invention, the stitchbonded fabric that serves as third layer 16 can include a nonwoven substrate made from heat shrinkable fibers that are also stretchable and elastic, such as spandex fibers. Spandex fibers are made from a rubber composition, such as polyurethane. Commercially available spandex fibers include LYCRA fibers marketed by E.I. Dupont de Nemours and Company. The fibers can be incorporated into the stitchbonded fabric in a loop pile construction or terry pile construction. Such fabrics can be constructed so that the fabrics will shrink when exposed to heat.

Besides spandex fibers, third layer 16 can also be made from bulkable fibers that become highly textured when exposed to heat. Such fibers include multicomponent or bicomponent fibers that contain a latent crimp that is activated when heated. Such bicomponent fibers include side-by-side fibers and sheath and core fibers. The bicomponent or multicomponent fibers can be made from, for instance, a combination of polyethylene polymers, polypropylene polymers and/or polyester polymers. The polymers selected for use in the fibers have different shrink properties which, when heated, causes the fiber to shrink and coil when exposed to heat.

Instead of or in addition to placing shrinkable fibers within the nonwoven web, third layer 16 can also be a stitchbonded fabric in which the sewn stitchbonded rows are formed using a heat shrinkable yarn. For instance, the yarn stitchbonded into the nonwoven fabric can be made from spandex fibers (including filaments) or bicomponent fibers as described above. In this embodiment, when subjected to heat, the yarn shrinks and pulls the fibers in the nonwoven substrate closer together.

In general, third layer 16 can be constructed so that the fabric will shrink in the lengthwise or warp direction and/or in the widthwise or weft direction. In one embodiment, when using a heat shrinkable nonwoven web, the fibers can be oriented in the weft direction perpendicular to stitched rows 18. In this manner, once heated, the fabric will primarily shrink in the weft direction, which is all that is needed in order to produce the ribbed-like appearance shown in FIGS. 1, 3, and 4. In an alternative embodiment, third layer 16 can be constructed so as to shrink primarily in the lengthwise direction. In this embodiment, the web can be oriented with respect to the other fabric layers in order to produce the ribbed-like appearance.

The amount layer 16 is shrunk when forming three dimension composite fabric 10 will generally depend upon the particular application and the amount the other layers contained within the composite fabric will have a tendency to shrink. For most applications, however, third layer 16 should shrink at least 5% in one direction, and particularly should shrink from about 10% to about 50%. In one preferred embodiment, fabric layer 16 will shrink in the widthwise direction in an amount from about 20% to about 40%.

As opposed to third layer 16, first layer or face fabric 12 should not substantially shrink during formation of composite fabric 10. For instance, when third layer 16 is shrunk using heat, face fabric 12 should be substantially heat stable and resistant to shrinking when exposed to heat. In this manner, when third layer 16 is shrunk after being attached to first layer 12, first layer 12 is caused to gather and form a three dimensional surface, such as a ribbed-like surface as shown in the figures.

Besides being a fabric that shrinks a lesser degree than third fabric 16, face fabric 12 can be made from any suitable material or fabric without limitation. In one embodiment of the present invention, for instance, face fabric 12 can be a loop pile stitchbonded fabric made from polyester fibers. Alternatively, face fabric 12 can be a warp knitted fabric, such as a fabric having a reverse satin stitch construction. In order to provide an aesthetic appearance and feel, in one embodiment, face fabric 12 can be made from a lustrous yarn, such as a 50 denier multifiliment or 20 denier monofilament polyester yarn.

Middle layer or fill layer 14 is provided in the embodiment illustrated in order to fill in the space between third layer 16 and face fabric 12. Fill layer 14, for instance, can be made from fibers having high loft characteristics, such as a fleece fabric. A fleece fabric refers to a fabric with a thick, heavy surface that may be a pile or napped fabric of either nonwoven, woven or knit construction. Fill layer 14 provides composite fabric 10 with cushioning properties but yet should be compression resilient.

In one preferred embodiment, fill layer 14 is made from siliconized polyester or wool fibers, which are fibers having a cured silicon coating. In one embodiment, the siliconzied fibers can be hollow and can have a denier of from about 6 to about 15.

In one embodiment, the fibers can be contained in a carded and cross-lapped nonwoven web. In the embodiment illustrated in FIGS. 1, 3 and 4, the fibers preferably have a cross direction orientation for providing optimum cushioning properties.

Besides carded and cross-lapped webs, fill layer 14 can also be an air laid web, a spunbond web, or a meltblown web. Further, fill layer 14 can be made from any suitable fill material or fibers.

Once layers 12, 14 and 16 are selected, the layers are stitched together according to a desired pattern such as by using stitched rows 18. As described above, stitched rows 18 can be stitchbonded rows. The stitchbonded rows can generally be from about ¼ inch about to 1 inch apart. In one embodiment, the composite fabric can include from about 2 to about 2.7 stitchbonded rows per inch.

Besides using stitchbonded rows, the fabric layers can be attached together using other stitching techniques in order to create composite fabrics having other various three dimensional conformations. For instance, in an alternative embodiment, the layers can be quilted together. For example, an atlas stitch construction can be used in which the layers are attached together by multiple intersecting rows of stitches which form squares and diamonds in the composite fabric.

One preferred embodiment of composite fabric 10 when used as a boot liner will now be discussed in detail. In this embodiment, third layer 16 is preferably made from a stitchbonded fabric containing LYCRA fibers and/or a LYCRA stitchbonded yarn. Third layer 16 can have a basis weight of from about 200 gsm to about 300 gsm, and particularly has a basis weight of about 240 gsm. Fill layer 14 preferably comprises a siliconzied hollow fiber fleece having a basis weight of from about 150 gsm to about 250 gsm, and particularly has a basis weight of about 200 gsm. Face fabric 12, on the other hand, is preferably a loop pile stitchbonded fabric made from polyester fibers having a basis weight of from about 250 gsm to about 350 gsm, and particularly of about 280 gsm.

These fabrics are stitchbonded together by a plurality of parallel rows. Once stitched together, the composite fabric is then heat treated causing third layer 16 to shrink more than face fabric 12 which creates the ridges shown in the figures. For example, in one embodiment, the composite fabric is heated to a temperature of from about 380° F. to about 390° F. which causes third layer 16 to shrink about 20% in a direction perpendicular to the stitchbonded rows.

As described above, it should be understood that although heat treating preferably is performed in order to cause third layer 16 to shrink, in an alternative embodiment, third layer 16 can be made from an elastic material that is prestretched prior to being attached to the remaining layers. In this embodiment, third layer 16 can be prestretched in the width direction, the length direction or in both directions. Once stretched and stitched to the other layers, a three dimensional fabric is created when third layer 16 is relaxed.

Figure 2:
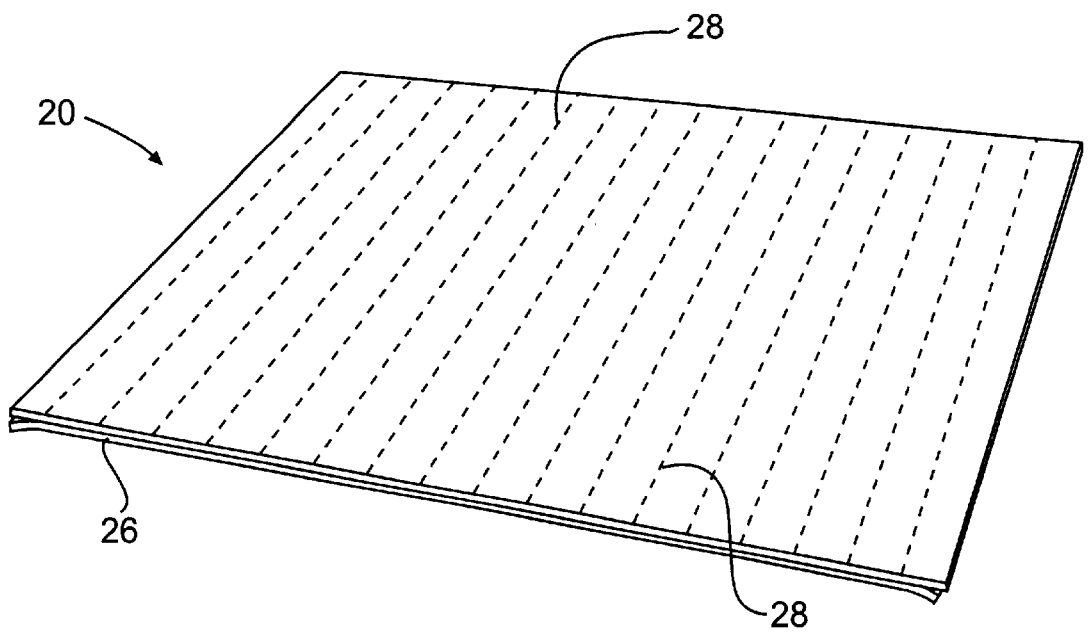
FIG. 2 is a perspective view of a two-ply embodiment of the invention before the composite fabric is relaxed or heat treated.

Referring to FIG. 2, an alternative embodiment of a composite fabric generally 20 made in accordance with the present invention is illustrated. In this embodiment, composite fabric 20 does not include a fill layer and is thus only a two layer product. As shown, composite fabric 20 includes a first layer or face fabric 22 attached to a second layer or shrinkable layer 26 by a plurality of stitched rows 28. Face fabric 22 and fabric 26 can be constructed similar to face fabric 12 and third layer 16 in the embodiment illustrated in FIGS. 1, 3 and 4 as described above.

In the embodiment illustrated in FIG. 2, composite fabric 20 is shown prior to shrinking second layer 26. Once heat treated, however, composite fabric 20 will appear similar to the embodiment illustrated in FIG. 1, 3 and 4 but will not include the fill layer. Consequently, composite fabric 20 will include air spaces in between face fabric 22 and fabric 26. These air spaces may be desired in various applications, such as in applications where breathability is important.

In another alternative embodiment, a fabric can also be constructed similar to the fabric illustrated in FIG. 3 and in FIG. 4, but without including face fabric 12. In this embodiment, the fill layer will serve as the exterior surface of the composite fabric product and will have a three dimensional conformation depending upon the manner in which the two layers are stitched together. In this embodiment, it may be preferred to stitch the two layers together using a quilting machine. For example, an atlas stitch construction can be used in order to form pillow-like squares with the fill material.

In still another alternative embodiment, the composite fabric product of the present invention can include a face fabric and a fill layer wherein the fill layer is shrinkable but the face fabric is not. For instance, the fill layer can be a fleece that is made from high shrink fibers. In this embodiment, after shrinking, the fill layer will remain flat while the face fabric will form a three dimensional surface in accordance with the pattern stitched into both layers.

Figure 5:
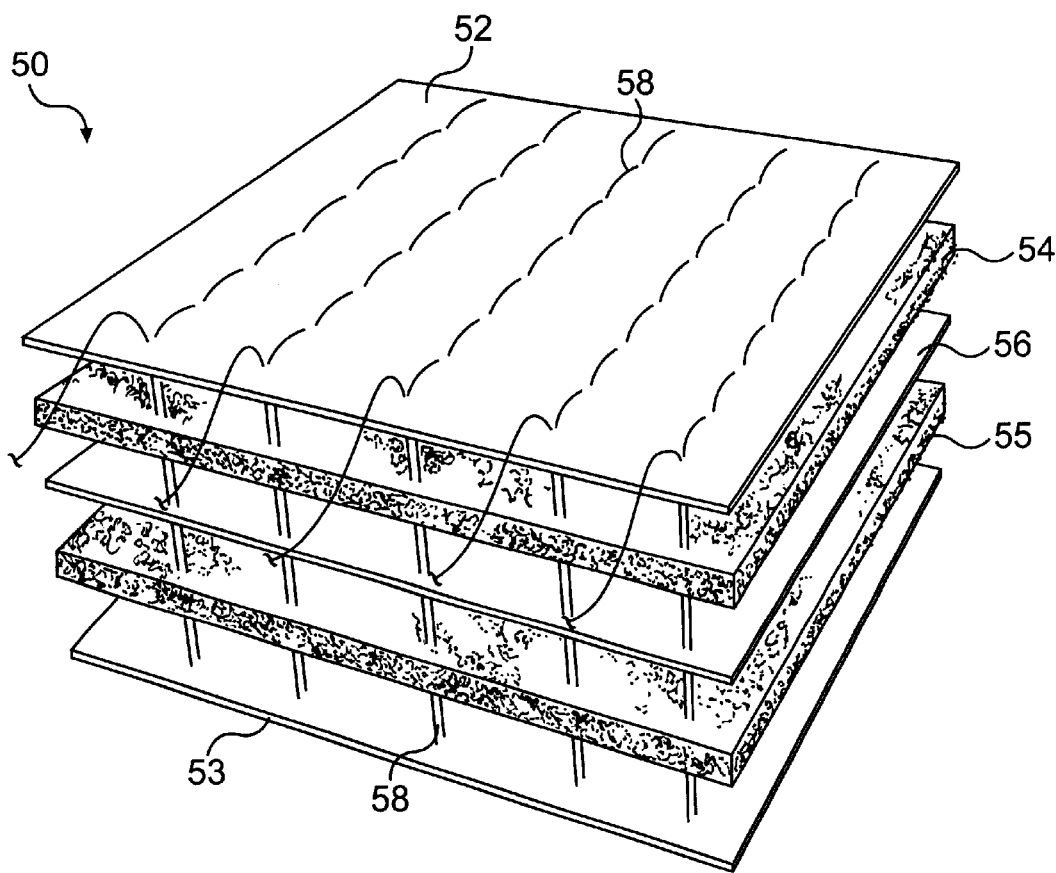
FIG. 5 is a exploded view of a five-ply embodiment of the invention.
Figure 6:
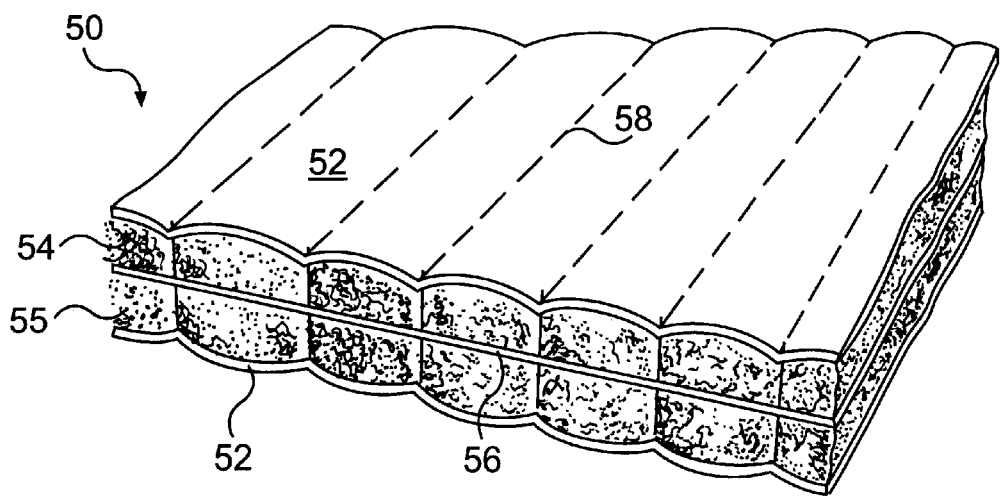
FIG. 6 is a perspective view of the embodiment shown in FIG. 5 of the invention after the fabric has been heat treated or relaxed.

Referring now to FIGS. 5 and 6, a still further alternative embodiment of a composite fabric, generally 50 made in accordance with the present invention is illustrated. In this embodiment, composite fabric 50 includes five (5) layers that have been stitched together by a plurality of parallel rows of stitches 58. Specifically, composite fabric 50 includes a first face fabric 52, a first fill layer 54, a shrinkable layer 56, a second fill layer 55, and a second face fabric 53. These fabrics can be constructed similar to the fabrics shown and described in FIGS. 1, 3 and 4. In this embodiment, however, composite fabric 50 has a three dimensional conformation on both sides, instead of just one side.

In another alternative embodiment of the present invention, a composite fabric product can be produced similar to the composite fabric illustrated in FIGS. 5 and 6 except without the inclusion of fill layer 54 and fill layer 55. In this embodiment, a three-layered composite fabric is produced containing air spaces between face fabric 52 and shrinkable layers 56 and between face fabric 53 and shrinkable layer 56.

While we have shown and described several embodiments in accordance with the present invention, it is understood that the same is not limited thereto but is susceptible to numerous changes and modifications as known to one having ordinary skill in the art. We therefore do not wish to be limited to the details shown and described herein, but intend to cover all such modifications as are encompassed by the scope of the appended claims.

These and other modifications and variations to the present invention may be practiced by those of ordinary skill in the art, without departing from the spirit and scope of the present invention, which is more particularly set forth in the appended claims. In addition it should be understood that aspects of the various embodiments may be interchanged both in whole or in part. Furthermore those of ordinary skill in the art will appreciate that the foregoing description is by way of example only, and is not intended to limit the invention so further described in such appended claims.

What is claimed is:

1. A three dimensional composite fabric product comprising:

a first fabric layer;

a second fabric layer containing shrinkable fibers;

a plurality of parallel rows of stitches connecting said first fabric layer to said second fabric layer; and wherein said second fabric layer has been shrunk in relation to said first fabric layer after said layers have been connected together by exposing said second fabric layer to heat causing said shrinkable fibers to shrink, thereby forming a plurality of ridges defined by said second fabric layer, each of said ridges being located in between said parallel rows of stitches.

2. A three dimensional composite fabric product as defined in claim 1, wherein said second fabric layer has a basis weight of at least 150 gsm.

3. A three dimensional composite fabric product as defined in claim 1, wherein said parallel rows of stitches comprise stitchbonded rows.

4. A three dimensional composite fabric product as defined in claim 1, wherein said product includes a first plurality of parallel rows of stitches and a second plurality of parallel rows of stitches wherein said first plurality of parallel rows of stitches intersect with said second plurality of parallel rows of stitches.

5. A three dimensional composite fabric product as defined in claim 1, wherein said shrinkable fibers comprise spandex fibers.

6. A three dimensional composite fabric as defined in claim 1, further comprising a fill layer positioned between said first fabric layer and said second fabric layer.

7. A three dimensional composite fabric as defined in claim 6, wherein said fill layer comprises a nonwoven web containing siliconized fibers.

8. A three dimensional composite fabric product as defined in claim 7, wherein said siliconized fibers are hollow.

9. A three dimensional composite fabric product as defined in claim 7, wherein said siliconized fibers have a denier of from about 6 to about 15.

10. A three dimensional composite fabric product as defined in claim 6, wherein said second fabric layer has been shrunk at least 10% in one direction.

11. A three dimensional composite fabric as defined in claim 1, wherein said second fabric layer has been shrunk at least 5% in one direction.

12. A three dimensional composite fabric product as defined in claim 11, wherein said shrinkable fibers comprise bicomponent fiber.

13. A three dimensional composite fabric product as defined in claim 11, wherein said second fabric layer comprises a stitchbonded fabric.

14. A three dimensional composite fabric product as defined in claim 13, wherein said stitchbonded fabric comprises a nonwoven web connected by stitches sewn through said web, said stiches being formed from a yarn containing said shrinkable fibers.

15. A three dimensional composite fabric product as defined in claim 14, wherein said shrinkable fibers comprise spandex fibers.

16. A three dimensional composite fabric product comprising:

a first fabric layer;

a fill layer comprising a fleece fabric;

a shrunk fabric layer, said fill layer being positioned in between said first fabric layer and said shrunk fabric layer, said shrunk fabric layer comprising a stitchbonded fabric containing spandex fibers;

a plurality of parallel rows of stitches connecting said layers together; and wherein said shrunk fabric layer has been shrunk to said first fabric layer after said layers have been connected together by said plurality of parallel rows of stitches, said shrunk fabric layer being shrunk by being exposed to heat causing said spandex fibers to shrink wherein said first fabric layer is gathered in between said rows of stitches, said first fabric layer thereby forming a ribbed-like three dimensional surface.

17. A three dimensional composite fabric product as defined in claim 16, wherein said fill layer contains siliconzied fibers having a denier of at least 6.

18. A three dimensional composite fabric product as defined in claim 16, wherein said fleece fabric comprises a carded and cross-lapped nonwoven web.

19. A three dimensional composite fabric product a as defined in claim 16, wherein said stitchbonded fabric comprising said shrunk fabric layer includes a nonwoven web connected together by a plurality of stitchbonded rows, said stitchbonded rows being formed by a yarn, said spandex fibers being contained within said yarn.

20. A three dimensional composite fabric product as defined in claim 16, wherein said shrunk fabric layer has been shrunk at least 10% in one direction.

21. A three dimensional composite fabric product as defined in claim 16, wherein said shrunk fabric layer has been shrunk at least 20% in one direction.

22. A three dimensional composite fabric product as defined in claim 16, wherein said shrunk fabric layer has a basis weight of from about 200 gsm to about 300 gsm, said fill layer has a basis weight of from about 150 gsm to about 250 gsm and said face fabric has a basis weight of from about 250 gsm to about 350 gsm.

23. A three dimensional composite fabric product as defined in claim 22, wherein said face fabric comprises a stitchbonded nonwoven web.

24. A three dimensional composite fabric product as defined in claim 22, wherein said face fabric comprises a warp knitted fabric.

25. A three dimensional composite fabric product comprising:

a first layer of fabric made from fibers in a manner so that the surface area of the fabric will change in at least one dimension after the layer is integrated into the composite fabric;

a second layer of fabric made of fibers in a manner so that the surface area of the second layer, after integration into the composite fabric changes substantially less than the first layer;

a fill layer positioned in between said first layer and said second layer; and a plurality of stitched connection points placed in a predetermined pattern attaching said layers together, wherein after the layers have been connected together at least one dimension of the first layer has changed relative to the second layer creating a three dimensional fabric effect said at least one dimension of said first layer having been shrunk by exposing said first layer to heat causing fibers contained in said first layer to shrink.

* * * * *